(12) United States Patent
Gay et al.

(10) Patent No.: US 9,626,498 B2
(45) Date of Patent: Apr. 18, 2017

(54) MULTI-PERSON GESTURAL AUTHENTICATION AND AUTHORIZATION SYSTEM AND METHOD OF OPERATION THEREOF

(71) Applicant: France Telecom, Paris (FR)

(72) Inventors: Julian Gay, San Francisco, CA (US); Adam Odessky, San Francisco, CA (US)

(73) Assignee: FRANCE TELECOM, Paris (FR)

( * ) Notice: Subject to any disclaimer, the term of this patent is extended or adjusted under 35 U.S.C. 154(b) by 0 days.

(21) Appl. No.: 13/715,533

(22) Filed: Dec. 14, 2012

(65) Prior Publication Data

US 2014/0007225 A1    Jan. 2, 2014

Related U.S. Application Data

(60) Provisional application No. 61/576,329, filed on Dec. 15, 2011.

(51) Int. Cl.
| | |
|---|---|
| *G06F 21/36* | (2013.01) |
| *G06F 21/32* | (2013.01) |
| *G06F 21/40* | (2013.01) |
| *H04B 7/00* | (2006.01) |
| *G06F 15/16* | (2006.01) |
| *H04L 9/00* | (2006.01) |

(52) U.S. Cl.
CPC .............. *G06F 21/36* (2013.01); *G06F 21/32* (2013.01); *G06F 21/40* (2013.01); *G06F 15/16* (2013.01); *H04B 7/00* (2013.01); *H04L 9/00* (2013.01)

(58) Field of Classification Search
CPC .......... G06F 21/36; G06F 21/40; G06F 21/32; H04L 9/00
See application file for complete search history.

(56) References Cited

U.S. PATENT DOCUMENTS

| | | | |
|---|---|---|---|
| 6,583,712 B1 * | 6/2003 | Reed ................. | G07C 9/00103 340/5.21 |
| 7,000,200 B1 * | 2/2006 | Martins ........................ | 715/863 |
| 8,516,561 B2 * | 8/2013 | White et al. ..................... | 726/7 |

(Continued)

OTHER PUBLICATIONS

Yaacov Apelbaum, User authentication principles theory and practice, 2004, Technology Press, second edition, p. 88.*

*Primary Examiner* — Jayesh Jhaveri
*Assistant Examiner* — Wasika Nipa
(74) *Attorney, Agent, or Firm* — David D. Brush; Westman Champlin & Koehler, P.A.

(57) ABSTRACT

A system of authorizing access to a resource including a processor obtaining sensor information related to at least two users from one or more sensors, the sensor information including one or more of image information and proximity information of each of the at least two users. Further, an act of identifying current gestures is performed for each of the at least two users in accordance with the sensor information. The current gestures may be compared with pre-stored gesture information related to predetermined gestures and an order of the predetermined gestures. Further, access to the resource may be authorized when it is determined that the current gestures are in accordance with the predetermined gestures and the order of the predetermined gestures.

19 Claims, 5 Drawing Sheets

(56) References Cited

U.S. PATENT DOCUMENTS

| | | | |
|---|---|---|---|
| 8,781,398 B2* | 7/2014 | Konded | G06F 3/04883 455/41.2 |
| 2003/0233573 A1* | 12/2003 | Phinney | 713/200 |
| 2005/0033962 A1* | 2/2005 | Libin | G07C 9/00103 713/170 |
| 2008/0170776 A1* | 7/2008 | Albertson et al. | 382/154 |
| 2011/0197263 A1* | 8/2011 | Stinson, III | G06F 3/011 726/4 |
| 2011/0205016 A1* | 8/2011 | Al-Azem et al. | 340/5.52 |
| 2013/0159939 A1* | 6/2013 | Krishnamurthi | 715/863 |

* cited by examiner

| Gesture Entry Mode | Time | Gesture 1 | Gesture 2 | Resource / Action |
|---|---|---|---|---|
| Simultaneous | $T_0$ |  |  | Rear Door / Unlock |
| Sequential | $T_0$ |  | | Front Door / Unlock |
| | $T_1$ (=3sec) | |  | |

-300A-

305 — Gesture 1; 303, 301 — Gesture 2

| Single camera (could be video, infrared, motion, depth) | Camera ID = 01 | | Resource / Action |
|---|---|---|---|
| Individuals (authenticated) | BOB<br>301 | JOHN | Authorize Missile Launch Missile ID 123-456; and Order 15" Pizza Pie from closest Pizza Store |
| Location (physically co-located) | Oval Office | Oval Office<br>301 | |

| | Camera 1 (NY) | Camera 2 (SF) | Resource / Action |
|---|---|---|---|
| Individuals (authenticated) | BOB<br>301 | JOHN | Authorize Missile Launch Missile ID 678-91011; turn off the lights; and lock all doors in NY and SF |
| Location (physically SEPARATED) | New York | San Francisco<br>301 | |

MULTI-PERSON GESTURAL AUTHENTICATION AND AUTHORIZATION SYSTEM AND METHOD OF OPERATION THEREOF

CROSS REFERENCE TO RELATED APPLICATION

The present application is based on and claims the benefit of U.S. provisional patent application No. 61/576,329, filed Dec. 15, 2011, the content of which is hereby incorporated by reference in its entirety.

FIELD OF THE PRESENT SYSTEM

The present system relates to an authentication system and, more particularly, to a multi-person gestural authorization system which can authorize access to one or more resources when both users are determined to be authorized, and a method of operation thereof.

BACKGROUND OF THE PRESENT SYSTEM

Recently motion-sensing gestural input systems have become popular for various applications such as for video games and the like. One popular motion sensing system is the Kinect™ system by Microsoft™ and can provide full three-dimensional (3-D) motion capture, facial recognition, user voice recognition, and gesture recognition directly and/or via additional applications. For example, the Kinect™ system may interface with an open-source library application such as the OpenNI™ application which may provide information related to a user such as image information, gesture information, proximity information, voice information, etc., for further processing. Accordingly, gestures of a user may be easily detected and identified for existing applications such as video gaming applications. However, unfortunately, there are no systems which provide a gesture-based authentication and/or authorization systems.

SUMMARY OF THE PRESENT SYSTEM

Accordingly, the present system may interface with conventional gesture sensing technologies, such as Microsoft's™ Kinect™ to implement complex gesture-based authentication and/or authorization procedures which can involve multiple users. The users may be physically present at the same or different locations (i.e., apart from each other) and may be authenticated and/or authorized by executing a series of gestures in simultaneously and/or sequentially (e.g., with respect to time) which match predetermined gestures which may be, for example, stored in a memory of the system.

In accordance with an aspect of the present system, there is disclosed a system, method, device, computer program, user interface, and/or apparatus (hereinafter each of which will be commonly referred to as a system unless the context indicates otherwise for the sake of clarity) of authorizing access to a resource. The method may include acts which are performed by a processor. The method may include an act of obtaining sensor information related to at least two users from one or more sensors, the sensor information including one or more of image information and proximity information for each of the at least two users. Further, the method may include an act of identifying current gestures performed by each of the at least two users in accordance with the sensor information. Moreover, the method may include an act of comparing the current gestures with pre-stored gesture information related to predetermined gestures and an order of the predetermined gestures. Further, the method may include an act of authorizing access to the resource when it is determined that the current gestures are in accordance with the predetermined gestures and the order of the predetermined gestures.

It is also envisioned that the method may include an act of authenticating the at least two users based upon one or more of a password, a passcode, voice recognition, facial recognition, and biometric identification. Moreover, it is envisioned that act of authorizing access to the resource may only be performed when the at least two users are authenticated. Further, the order of the predefined gestures may include a simultaneous order or a sequential order with respect to time. According to yet another aspect of the method, it is envisioned that the sensor information may further include one or more of time information and location information, the time information may be indicative of a time when a corresponding gesture of the current gestures is performed and the location information may be indicative of a location where a corresponding gesture of the current gestures is performed. It is further envisioned that the act of authorizing access to the resource may only be performed when the location information of each of the current gestures is determined to be in accordance with a predefined location of a corresponding gesture of the predetermined gestures.

In accordance with embodiments of the present system, there is disclosed a system to authorize access to a resource, the system including a processor which may obtain sensor information related to at least two users from one or more sensors, the sensor information including one or more of image information and proximity information of each of at least two users; identify current gestures performed by each of the at least two users in accordance with the sensor information; compare the current gestures with pre-stored gesture information related to predetermined gestures and an order of the predetermined gestures; and/or may authorize access to the resource when it is determined that the current gestures are in accordance with the predetermined gestures and the order of the predetermined gestures.

It is further envisioned that the processor may authenticate the at least two users based upon one or more of a password, a passcode, voice recognition, facial recognition, and biometric identification. Further, the processor may authorize access to the resource only when the at least two users are authenticated. Moreover, the order of the predefined gestures may include a simultaneous order or a sequential order with respect to time.

It is also envisioned that the sensor information may include one or more of time information and location information, the time information indicative of a time when a corresponding gesture of the current gestures is performed and the location information indicative of location where a corresponding gesture of the current gestures is performed. Further, the processor may only authorize access to the resource only when the location information of at least one of the current gestures is determined to be in accordance with a location defined by a corresponding one of the predetermined gestures.

In accordance with yet another aspect of the present system, there is disclosed a computer program stored on a computer readable memory medium, the computer program configured to authorize access to a resource, the computer program including a program portion configured to obtain sensor information related to at least two users from one or more sensors, the sensor information including one or more of image information and proximity information of each of at least two users; identify current gestures performed by each of the at least two users in accordance with the sensor information; compare the current gestures with pre-stored gesture information including information related to predetermined gestures and an order of the predetermined gestures; and/or authorize access to the resource when it is determined that the current gestures are in accordance with the predetermined gestures and the order of the predetermined gestures.

It is further envisioned that the program portion may be further configured to authenticate the at least two users based upon one or more of a password, a passcode, voice recognition, facial recognition, and biometric identification. Moreover, the program portion may be further configured to authorize access to the resource only when the at least two users are authenticated. Further, the order of the predefined gestures may include a simultaneous order or a sequential order with respect to time.

The program portion may be further configured to form the sensor information to include one or more of time information and location information, the time information indicative of a time when a corresponding gesture of the current gestures is performed and the location information indicative of location where a corresponding gesture of the current gestures is performed. Further, the program portion may be further configured to authorize access to the resource only when the location information of at least one of the current gestures is determined to be in accordance with a location defined by a corresponding one of the predetermined gestures.

It is also envisioned that the program portion may be further configured to determine whether the at least two users are distinct from each other; and authorize access to the resources only when it is determined that the at least two users are distinct from each other.

BRIEF DESCRIPTION OF THE DRAWINGS

Aspect of the present disclosure are explained in further detail, and by way of example, with reference to the accompanying drawings wherein.

DETAILED DESCRIPTION OF THE PRESENT SYSTEM

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well-known devices, circuits, tools, techniques, and methods are omitted so as not to obscure the description of the present system. It should be expressly understood that the drawings are included for illustrative purposes and do not represent the scope of the present system. In the accompanying drawings, like reference numbers in different drawings may designate similar elements.

The term rendering and formatives thereof as utilized herein refer to providing content, such as digital media which may include, for example, image information, information generated and/or accessed by the present system, messages, status information, settings, audio information, video information, audiovisual information, etc., such that it may be perceived by at least one user sense, such as a sense of sight and/or a sense of hearing. For example, the present system may render a user interface (UI) on a display device so that it may be seen and interacted with by a user.

Figure 1:
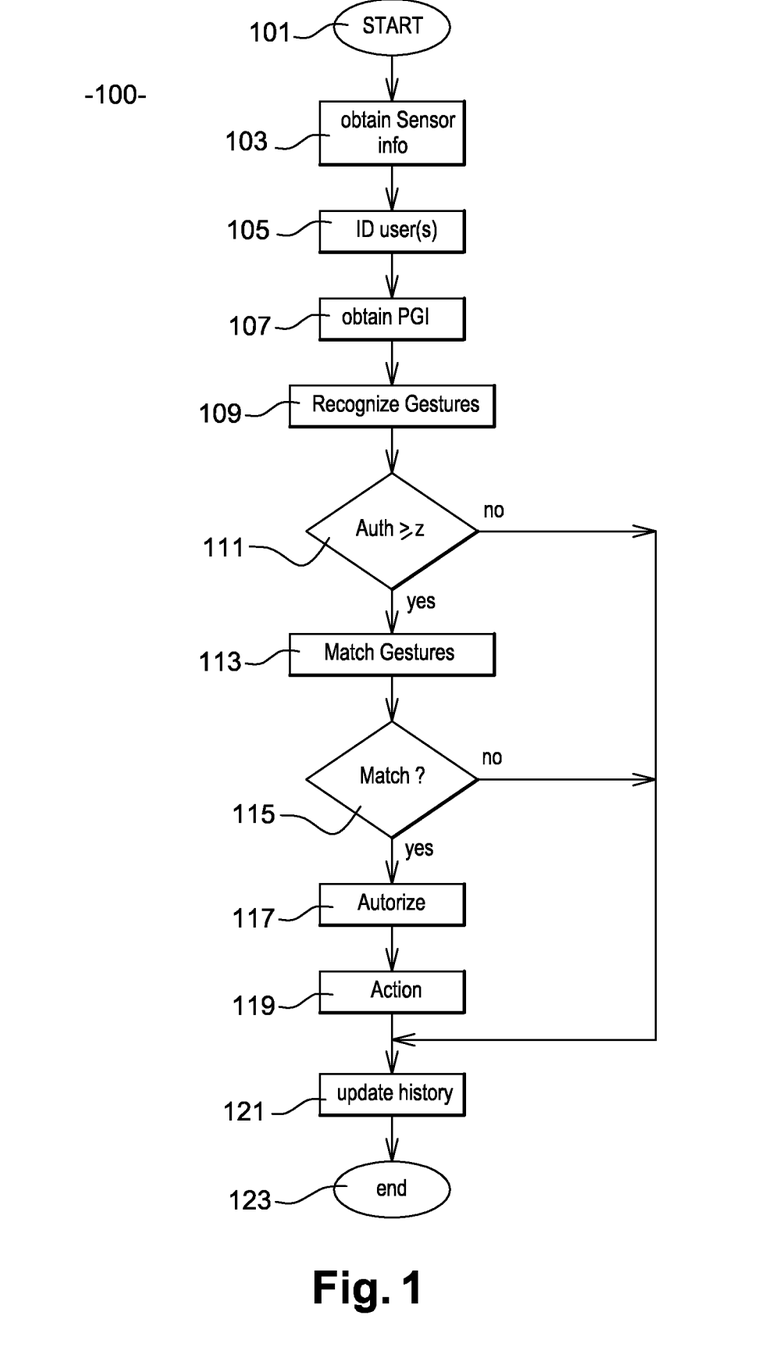
FIG. 1 shows a flow diagram that illustrates a process in accordance with embodiments of the present system.

FIG. 1 shows a flow diagram that illustrates a process 100 in accordance with embodiments of the present system. The process 100 may be performed using one or more computers communicating over a network. The process 100 may include one of more of the following acts. Further, one or more of these acts may be combined and/or separated into sub-acts, if desired. In operation, the process 100 may start during act 101 and then proceed to act 103. The process is may start in response to a certain action or actions such as when a sensor detects a user (e.g., in a certain location, etc.), after a password or pass code (hereinafter both of which will be referred to as a password) is entered (e.g., via a UI of the system), etc.

During act 103, the process may obtain sensor information from one or more sensors of the system. The sensor information may provide information related to one or more users such as image information, gesture information, proximity information, voice information, location information, ambient condition information, time information (e.g., a time stamp indicative of a time when the gesture was formed by the user and/or recorded by the system), etc., which may be processed to identify a user (e.g., via any suitable method such as image analysis, voice recognition, etc.), determine gestures performed by each user, determine location of each user, and/or determine ambient conditions in the vicinity of the sensors. The sensor information may be provided by a sensor array such a may be provide by the Kinect™ system and/or additional sensors, as desired. After completing act 103, the process may continue to act 105.

During act 105, the process may identify (ID) one or more of the users using any suitable method. For example, the process may identify one or more of the users using voice recognition, facial recognition, biometric identification, a password, account information, address information (e.g., a physical and/or logical address), etc., as may be set by the system and/or user. When a user is identified, the system may determine whether the user can be authenticated as a registered user in accordance with account information. For example, John Doe may only be authenticated at certain times and at a first location and not at another location or at other times. Further, it is envisioned that in embodiments of the present system, if a user cannot be identified, the system may set this user as a default user and thereafter authenticate this user as a default user. Once a user is identified, the user may be authenticated by the system in accordance with authentication rules as may be set by default rules, the system and/or user. The authentication rules may be stored in a memory of the system. After completing act 105, the process may continue to act 107.

During act 107, the process may obtain pre-stored gesture information (PGI) from a memory of the system. The PGI may be specific to an identified user or users (e.g., may be dependent upon a specific user or users), a group of users (which may be independent of user ID), specific to a resource (e.g., launch code PGI users A and users B must be authenticated), and/or may be specific to a location (e.g., front access door, etc.). In the present example, it will be assumed that the PGI may be obtained based upon an identity of one or more authenticated users. After completing act 107, the process may continue to act 109.

During act 109, the process may analyze the sensor information to recognize one or more gestures performed by each authenticated user (or non-authenticated user, if desired). The gestures may be recognized using any suitable gesture recognition method. For example, the gestures may be recognized by a conventional third-party application such as the Kinect™ system. After competing act 109, the process may continue to act 111.

During act 111, the process may determine whether the number of authenticated users is greater than, or equal to, a threshold value (e.g., two in the current example). Accordingly, if it is determined that the number of authenticated users is greater than, or equal to, two, the process may continue to act 113. However, if it is determined that number of authenticated users is not greater than, or equal to, two, the process may continue to act 121.

During act 113, the process may match the gestures recognized during act 109 with corresponding gestures in the PGI. In the present example, it will be assumed that the gestures of the first and second authenticated users will be compared to corresponding gestures in the PGI for each authenticated user. Thus, assuming that John and Jane have gestures stored in the PGI and form current gestures, the process may attempt to match John's current gestures with John's pre-stored gestures in the PGI and may attempt to match Jane's current gestures with Jane's pre-stored gestures in the PGI. After completing act 113, the process may continue to act 115.

During act 115, the process may determine whether the current gestures for each user are in accordance with (e.g., match or are substantially in accordance with, if desired) pre-stored gestures of the PGI for each authenticated user. Accordingly, if it is determined that the current gestures for each authenticated user are in accordance with (i.e., match) the corresponding pre-stored gestures of the PGI for each authenticated user, the process may continue to act 117. However, if it is determined that the current gestures for each authenticated user are not in accordance with (i.e., do not match) corresponding pre-stored gestures of the PGI for each authenticated user, the process may continue to act 121.

During act 117, the process may authorize access to one or more resources in accordance with the gestures performed by the users. The authorization process may include an action such as may be set by the system and/or user. For example, in embodiments of the present system an authorization process may authorize a user to access a resource such as a file, a directory, an application, a process, etc. Further, in embodiments of the present system the authorization may further perform an action during act 119 such as unlocking a door, activating/deactivating a system, enabling/disabling a launch procedure, entering a command, ordering take-out, etc. In embodiments of the present system, two or more authorizations/actions may be performed such as access to a resource and unlocking a door, etc. The two or more authorizations/actions performed during acts 117, 119 may be in accordance with corresponding authorizations/actions listed in the PGI. After completing act 119, the process may continue to act 121.

During act 121, a history of authorized users, recognized gestures, authorizations, actions, etc. may be updated to reflect the current acts. After completing act 121, the process may continue to act 123 where it may end.

Figure 2:
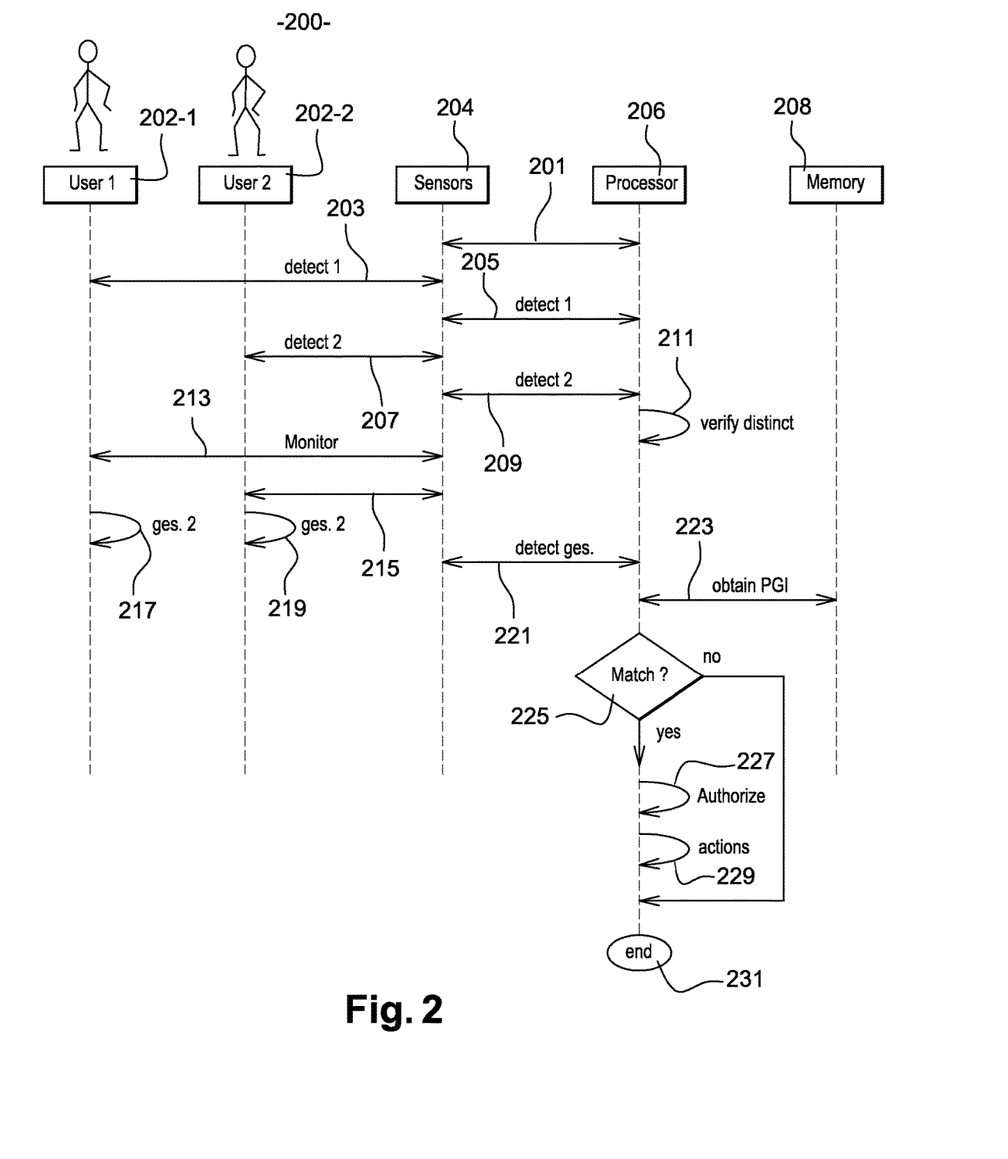
FIG. 2 shows a flow diagram that illustrates a process in accordance with embodiments of the present system.

FIG. 2 shows a flow diagram that illustrates a process 200 in accordance with embodiments of the present system. The process 200 may be performed using one or more computers communicating over a network. For example, the process may be performed by one or more of first and second users 202-1 and 202-2, respectively, sensors 204, a processor 206, and a memory 208. The process 200 may include one of more of the following acts. Further, one or more of these acts may be combined and/or separated into sub-acts, if desired. In operation, the process 200 may start during act 201 and then proceed accordingly. During act 201, the processor 206 may activate a monitoring process of the present system. Accordingly, the processor may transmit an activation command (ACTIVATE) to the sensors 204 to inform the sensors 204 to capture information related to the first and second users 202-1 and 202-2, respectively. Thereafter, the sensors 204 may capture sensor information which may include, for example, image information (e.g., 2 or 3-D image), proximity information, identity information (e.g., ID), etc., related to each user 202-x and transmit the sensor information to the processor 206 during acts 205 and 209 as will be discussed below. The sensor information may further include location information (e.g., the location of the sensors, the location of the uses, etc.), camera identification information, ambient environmental information (e.g., temperature, pressure, etc.), time information (e.g., a time stamp indicative of when certain parts of the sensor information such as images of a user and/or proximity information were captured), etc. Information contained in the sensor information may be set by default, the system and/or user.

During act 203, the sensors 204 may detect the first user 202-1. Accordingly, the sensors 204 may form and transmit sensor information indicating such to the processor 206 during act 205. During act 207, the sensors 204 may detect the second user 202-2. Accordingly, the sensors 204 may form and transmit sensor information indicating such to the processor 206 during act 209. As may be readily appreciated, an order of detecting the users may or may not be significant to authorize the users as may be specified by the PGI stored in the memory of the system. For example, the PGI may require an order of detecting users (e.g., first user detected first and second user detected second). In this case, if the order of detected users is not in accordance with the PGI stored in the memory, then even users that have authorization to provide gestures may not be authorized due to the discrepancy in the order of detecting users. In accordance with further embodiments of the present system, the order of detecting users may not affect whether or not a user is authorized (e.g., as a default condition unless changed by the system and/or user). After completing act 209, the process may continue to act 211.

During act 211, the processor 206 may determine whether two distinct users (e.g., the first and second users 202-1, 202-2, respectively, being different users) are present. Accordingly, if it is determined that two distinct authorized users are present, the process may continue. However, if it is determined that two distinct users are not present (e.g., only a single user is present or that the first and second users 202-1 and 202-2, respectively, are the same individual), the process may continue to act 231 where it may end. The process may determine that the first and second users 202-1 and 202-2, respectively, are distinct using any suitable method such as by image analysis (e.g., facial recognition), biometrics, voice recognition, user identification, etc.

During acts 213 and 215 the process may respectively monitor for gestures formed by the first and second users 202-1 and 202-2, respectively. Accordingly, the process may analyze the sensor information for gestures during acts 213 and 215.

During act 217, the first user 202-1 performs a gesture. Similarly, during act 219 the second user 202-2 performs a gesture. Accordingly, during act 221 the sensors 204 may transmit sensor information including information related to these gestures (i.e., current gestures) to the processor 206 and the processor may detect the current gestures performed by the corresponding user (202-x). During act 223, the processor 206 may obtain pre-stored gesture information (PGI) from the memory 208. Thereafter, during act 225 the processor 206 may determine whether the current gestures match pre-stored gestures in the PGI and associated information. The associated information may, for example, be indicative of whether the current gestures may be accepted from the current users, should be synchronous or sequential, formed in the same location or a different location, etc. Accordingly, if the current gestures and information related thereto match (e.g., as a result of comparing users, order, location, etc.) corresponding information in the PGI, the process may determine that there is a match and continue to act 227. However, if it is determined that there is no match, the process may inform the users that they are not authorized, provide instructions to re-perform the gestures (e.g., is the users are authorized but the gestures, order, etc. do not match) or may simply continue to act 231 where it may end.

During act 227 the process may authorize access to a corresponding resource in accordance with information set forth in the PGI. After completing act 227, the process may continue to act 229. During act 229, the process may perform one or more actions as may be set forth in the corresponding PGI. For example, the process may launch a missile, order pizza, etc. Further, the process may render settings and/or results of the process on a UI of the system for the convenience of one or more users. For example, the process may render information indicating that an authentication has been established on a UI of the present system. This information may, for example, be superimposed upon an image of a corresponding user which may be rendered for the convenience of the user. After completing act 229, the process may continue to act 231 where it may end.

In accordance with embodiments of the present system, the scenarios described above may be executed with authenticated or non-authenticated users. Users may be authenticated using any suitable method such as by entering a password, using biometric, voice, image analysis, etc. In accordance with embodiments of the present system—it is also envisioned that the system may be operative with anonymous users. Thus, in accordance with embodiments of the present system a user may be authenticated (e.g., by entering a password of the user) and thereafter the system may monitor the user with the expectation that the user is to perform a certain gesture. When the gesture is recognized, the process may authenticate the user, be provided access to a resource, perform an associated action (e.g., unlocking a door), etc. Further, different individuals may use different gestures to effect an action. It is envisioned that a scenario involving anonymous (e.g., not authenticated) users could rely solely on the matching of the sequence of gestures with a predefined pattern irrespective of who executed the gestures.

Figure 3A:
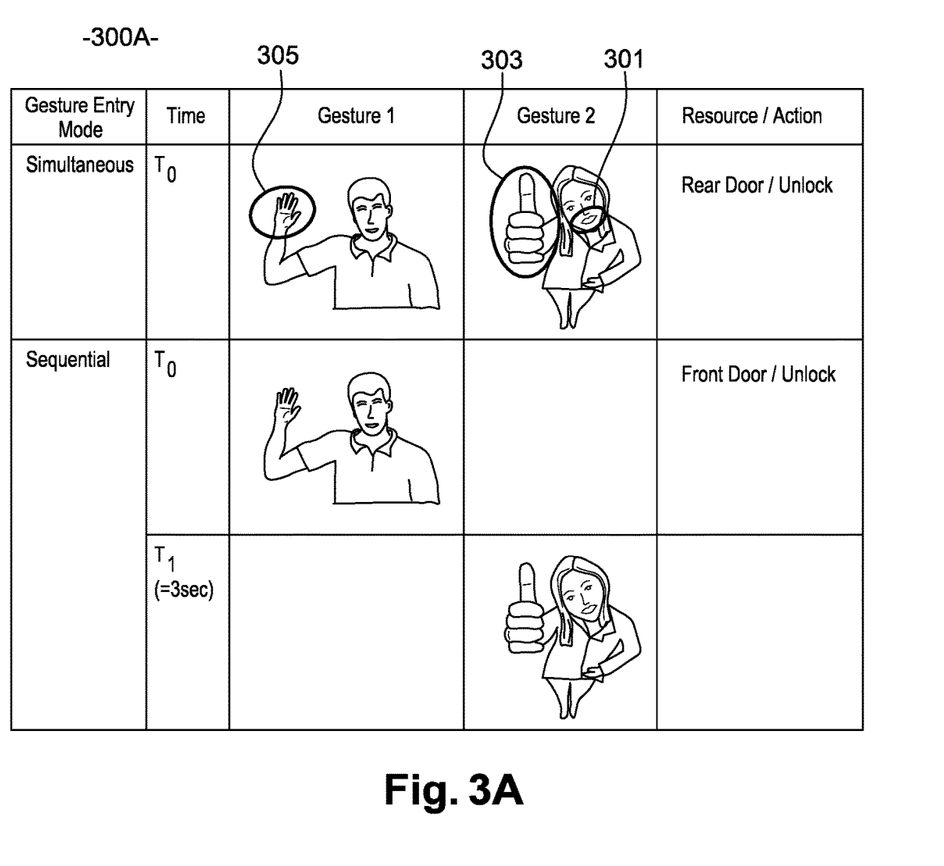
FIG. 3A shows a gesture lookup table for simultaneous or sequential gestures in accordance with embodiments of the present system.
Figure 3B:
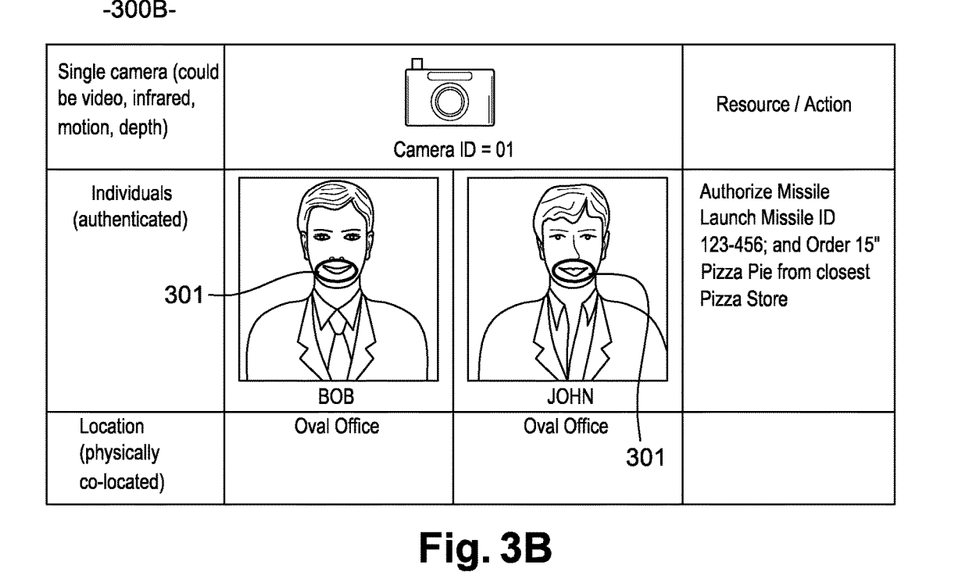
FIG. 3B shows a gesture lookup table in accordance with embodiments of the present system.
Figure 3C:
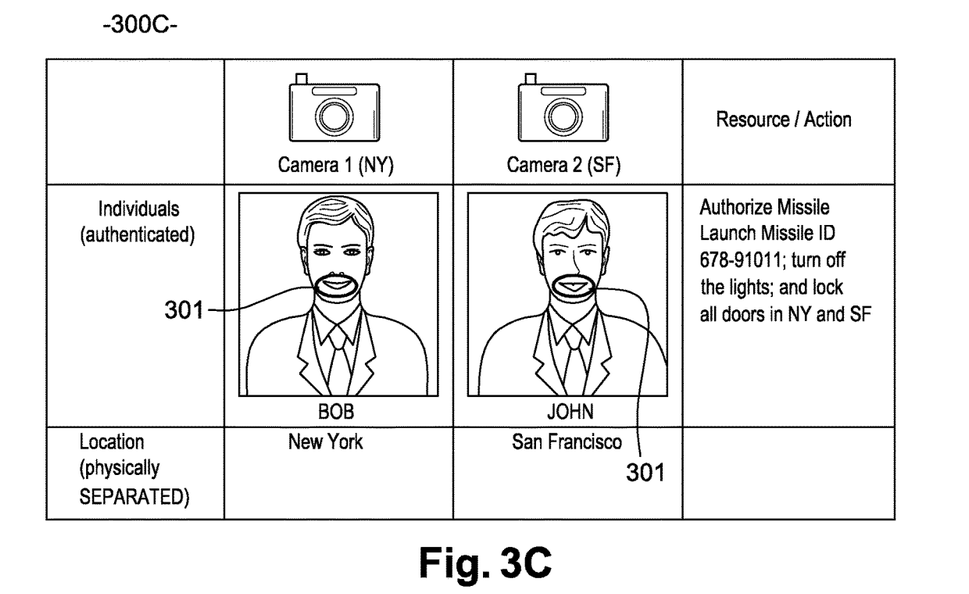
FIG. 3C shows a gesture lookup table in accordance with embodiments of the present system.

FIGS. 3A through 3C illustrate gesture lookup tables upon which the PGI may be formed in accordance with embodiments of the present system. The gesture lookup tables may be formed during a training process of the present system where a user or users forming one or more gestures is/are observed and thereafter the system may store corresponding information as PGI in a memory of the system. Further, the PGI may include information related to the gestures such as whether they should be simultaneous or sequential in order, whether users should be collocated or separate from each other, locations of the user, and/or whether a user should be authenticated, as will be described below. As information in the PGI may be customized for each use, for the sake of clarity only a few simple examples will be described below. However, it is envisioned that the PGI may be customized using other inputs and/or requirements as may be desired by a user and/or system.

With regard to FIG. 3A, a gesture lookup table 300A for simultaneous or sequential gestures is shown in accordance with embodiments of the present system. As discussed elsewhere gestures may be executed simultaneously or sequentially. Further, gestures may be the same (e.g., two users waving together) or different from each other (e.g., one user waves and while the other gives a thumbs-up) as illustrated in the gesture lookup table 300A. The process may also distinguish between overt gestures (e.g., waving) or subtle gestures (e.g., smiling, winking, moving the eyes from side to side). Accordingly, gesture information for a resource (with or without regard to users) or a user (with or without regard to resources) maybe stored in a memory of the system and recalled for comparison with currently detected gestures. For example if a resource requires that one user provide an open palm gesture (e.g., waving) and that another user give a thumbs up gesture and a smile gesture, the system may record such information using a table lookup such as shown in table 300A. Further, the lookup table may provide information on actions performed upon an authorized resource such as unlock the front and/or rear door when the current gestures (e.g., the gestures recognized as being performed by the users) match or substantially match gestures stored in the gesture lookup table of the PGI for a resource and/or a user. Thus, for example, if the process determines that a first user has performed an open palm gesture (waving) and that another user has performed a thumbs up gesture and a smile gesture where both gestures were performed simultaneously, the system may authorize a resource (e.g., by unlocking a rear door in the current example) in accordance with corresponding instructions stored in the Table 300A. However, if the process determines that the same gestures were entered sequentially (e.g., within a sequence time period such as 3 seconds apart in the present example--although other times are also envisioned), the process may authorize a corresponding resource (e.g., by unlocking a front door in the current example) in accordance with corresponding instructions stored in the Table 300A. Further, the gestures may be further distinguished as micro-gestures (e.g., see, smile 301) or macro-gestures (e.g., waving hand 305 and thumbs-up 303).

Users may further be in the same location (co-located) or may be located remote from each other. In accordance with embodiments of the present system, the gestures may be detected by sensors and/or processors of the system which may be distributed about a geographic area. Table 1 below illustrates relationships between simultaneous and sequential as well as co-located and remote gestures performed by corresponding users.

TABLE 1

|  | Co-located | Remote (separately located) |
|---|---|---|
| Simultaneous | Two or more users execute a gesture simultaneously, such as waving. The system may analyze image information obtained from a camera and detect that the gestures are being executed by distinct individuals. | Two or more users which are separately located, execute a gesture simultaneously, such as waving. Cameras, location information (e.g., geo-location data, camera identification, etc.) and image information obtained from the sensors may be analyzed to verify that the participants are distinct and separately located. |
| Sequential | Two or more users execute a gesture sequentially, such as waving. The system may analyze image information obtained from a camera and detect that the gestures are being executed by distinct individuals. | Two or more users which are separately located, execute a gesture sequentially, such as waving. Cameras, location information and image information obtained from the sensors may be analyzed to verify that the participants are distinct and separately located. |

FIGS. 3B, 3C show gesture lookup tables in accordance with embodiments of the present system. Referring to FIGS. 3B and 3C, the system may be configured such that users must be authenticated (e.g., must match predetermined users) in order for an authorization to occur. Further, with regard to location, the system may require that the users be located in the same location (e.g., see, co-located Table 300B) or in different locations (i.e., physically separated (e.g., see, Table 300C)). In accordance with the illustrative embodiments shown in Tables 300B and 300C, the gestures set forth in these tables must be performed concurrently. Accordingly, with reference to Table 300B, if it is determined that two users are authenticated and smile concurrently in the same location as set forth by Table 300B, the system may authorize a resource and/or take a predetermined action such as to authorize a launch (e.g., of a missile), and may order a 15" pizza pie. Similarly, with reference to Table 300C, if it is determined that two users are authenticated and smile concurrently in different locations as set forth by Table 300C, the system may authorize a resource and/or take a predetermined action such as to authorize a launch (e.g., of a missile), turn off the lights (e.g., in a defined area), and may lock all the doors in a defined area (e.g., in NY and SF). Thus, depending up requirements set forth in the PGI, the system may analyze different information in the sensor information, may compare different parts of the sensor information with corresponding parts of the PGI, and/or may authorize in accordance with results of the comparison.

Thus, embodiments of the present system may be ideal for multi-person authentication and authorization procedures as may be required by the US Air Force's "Two Person Concept" (as defined at en.wikipedia.org/wiki/Two-man_rule) which seeks to provide a mechanism to minimize or eliminate false or unauthorized access to a system, service or location. This concept is described per US Air Force Instruction (AFI) 91-104, "The Two Person Concept" and is designed to prevent accidental or malicious launch of nuclear weapons by a single individual. In the case of Minuteman missile launch crews, both operators must agree that the launch order is valid by comparing the authorization code in the launch order against the code from a Sealed Authenticator (i.e. special sealed envelope which holds the code). These Sealed Authenticators are stored in a safe which has two separate locks so a single crew member cannot open the safe alone. Each crew member has two launch keys; both crew members must turn their keys simultaneously. Four keys are required to prevent one person from initiating a launch. For additional protection, the missile crew in another Launch Control Center must do the same actions for the missiles to be launched.

In accordance with embodiments of the present system, rather than using physical keys or a powered device, such as a smartphone or a remote control, the present system may employ gesture-sensing technologies to enable two or more selected users (e.g., operators) to execute one or more gestures to "unlock" a resource without requiring physical keys, etc. In accordance with embodiments of the present system, when the process authorizes a resource it may be considered to "unlock" the resource. The system may also take into account other environmental factors to determine whether an "unlocking" process may occur such as evaluating ambient conditions (e.g., temperature and/or pressure). Thus, for example, the system may determine whether temperature and/or pressure at a certain location or locations is within a certain range or ranges and may perform an "unlocking" procedure only if it is determined that the temperature and/or pressure is within a desired range and/or ranges. This information may be set forth in the PGI by default, a user and/or the system.

Figure 4:
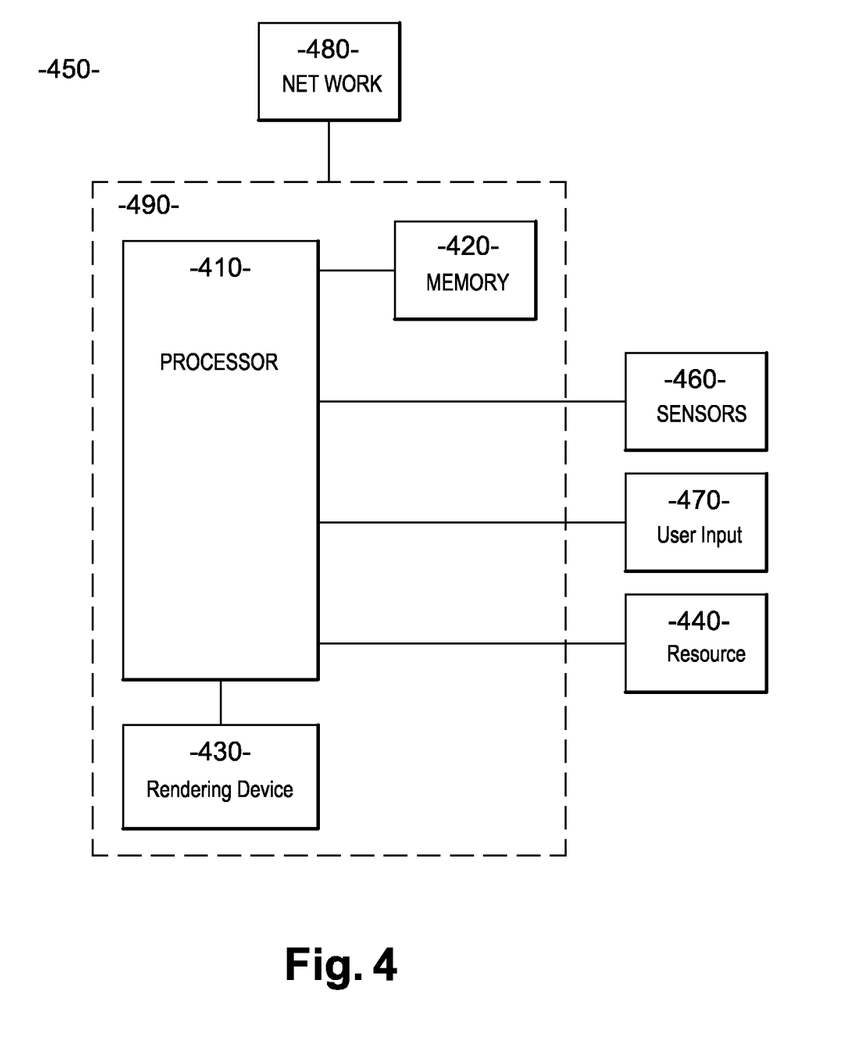
FIG. 4 shows a portion of a system in accordance with an embodiment of the present system.

FIG. 4 shows a portion of a system 400 in accordance with an embodiment of the present system. For example, a portion of the present system may include a processor 410 operationally coupled to a memory 420, a display 430, sensors 460, a resource 440, and a user input device 470. The memory 420 may be any type of device for storing application data as well as other data related to the described operation such as user data, PGI, etc. The sensors 460 may include one or more cameras and/or proximity sensors such as video, infrared and/or depth-based detection cameras such as may be provided by the Kinect™ system. Further, the sensors 460 may include a microphone, a biometrics sensor (to biometrically identify a user), and/or an ambient condition sensor (e.g., to detect one or more of temperature, pressure, humidity, sunlight, precipitation (e.g., rain, snow, sleet, etc.), etc.). The sensors 460 may be configured as desired. For example, if ambient conditions are desired to be checked and matched before authorization, the system may include an ambient condition sensor. Additionally, the sensors 460 may include location sensors (e.g., GPS sensors, triangulation sensors, etc.) to report location of the sensors.

The sensors may form sensor information which may include 2- or 3-D image information of a user, ambient conditions (e.g., 70 degrees Fahrenheit), time information (e.g., time when gesture was captured by the system such as 14:51:03 GMT, Jul. 6, 2022), location information (e.g., 21 Main St. NY, N.Y.), etc. The camera may include a video camera which may capture and generate image information of one or more users. Similarly, the proximity sensors (e.g., infrared sensors) may generate proximity information to determine location and/or proximity of one or more body parts of a user. Thereafter, the image information and/or proximity information may be included in the sensor information and transmitted to the processor 410 for further processing to determine, for example, gestures formed by the one or more users. The application data and other data are received by the processor 410 for configuring (e.g., programming) the processor 410 to perform operation acts in accordance with the present system. The processor 410 so configured becomes a special purpose machine particularly suited for performing in accordance with the present system.

The operation acts may include requesting, providing, and/or rendering of content. The user input 470 may include a keyboard, mouse, trackball, or other device, including touch sensitive displays, which may be stand alone or be a part of a system, such as part of a personal computer, personal digital assistant (PDA), mobile phone, smart phone, set top box, television or other device for communicating with the processor 410 via any operable link. The user input device 470 may be operable for interacting with the processor 410 including enabling interaction within a UI as described herein. Clearly the processor 410, the memory 420, display 430 and/or user input device 470 may all or partly be a portion of a computer system or other device.

The methods of the present system are particularly suited to be carried out by a computer software program, such program containing modules corresponding to one or more of the individual steps or acts described and/or envisioned by the present system. Such program may of course be embodied in a computer-readable medium, such as an integrated chip, a peripheral device or memory, such as the memory 420 or other memory coupled to the processor 410.

The program and/or program portions contained in the memory 420 configure the processor 410 to implement the methods, operational acts, and functions disclosed herein. The memories may be distributed, for example between user devices, or local, and the processor 410, where additional processors may be provided, may also be distributed or may be singular. The memories may be implemented as electrical, magnetic or optical memory, or any combination of these or other types of storage devices. Moreover, the term "memory" should be construed broadly enough to encompass any information able to be read from or written to an address in an addressable space accessible by the processor 410. With this definition, information accessible through a network is still within the memory, for instance, because the processor 410 may retrieve the information from the network for operation in accordance with the present system.

The processor 410 is operable for providing control signals and/or performing operations in response to input signals from the user input device 470 as well as in response to other devices of a network and executing instructions stored in the memory 420. Further, the processor 410 is operable for providing control signals (e.g., to the resource 440) and/or performing operations in accordance with operative commands (e.g., as may be set forth in the PGI) of the present system. The processor 410 may be an application-specific or general-use integrated circuit(s). Further, the processor 410 may be a dedicated processor for performing in accordance with the present system or may be a general-purpose processor wherein only one of many functions operates for performing in accordance with the present system. The processor 410 may operate utilizing a program portion, multiple program segments, and/or may be a hardware device utilizing a dedicated and/or multi-purpose integrated circuit. Further variations of the present system would readily occur to a person of ordinary skill in the art and are encompassed by the following claims.

Finally, the above-discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. In addition, the section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or an preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices, acts or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. A method of authorizing access to a resource, the method comprising acts which are performed by a processor, the acts comprising:

obtaining sensor information related to at least two users from one or more sensors, the sensor information comprising one or more of image information or proximity information of each of the at least two users;

identifying with the processor current gestures performed by each of the at least two users in accordance with the sensor information, regardless of a temporal order in which the current gestures are performed by the at least two users; and when the at least two users are identified, detecting the temporal order at which the current gestures were performed by the at least two identified users based on the sensor information;

comparing the current gestures of each of the at least two identified users and the temporal order of the current gestures between the at least two identified users with pre-stored gesture information specific to each identified user and related to predetermined gestures and an order of the predetermined gestures; and authorizing access to the resource when the processor determines that the current gestures are in accordance with the predetermined gestures, and the temporal order of the current gestures are in accordance with the order of the predetermined gestures.

2. The method of claim 1, further comprising an act of authenticating the at least two users based upon one or more of a password, a passcode, voice recognition, facial recognition, or biometric identification.

3. The method of claim 2, wherein the act of authorizing access to the resource is only performed when the at least two users are authenticated.

4. The method of claim 1, wherein the order of the predefined gestures comprises a simultaneous order or a sequential order with respect to time.

5. The method of claim 4, wherein the sensor information further comprises one or more of time information or location information, the time information being indicative of a time when a corresponding gesture of the current gestures is performed and the location information being indicative of a location where a corresponding gesture of the current gestures is performed.

6. The method of claim 5, wherein the act of authorizing access to the resource is only performed when the location information of each of the current gestures is determined to be in accordance with a predetermined location of a corresponding gesture of the predetermined gestures.

7. A system to authorize access to a resource, the system comprising:

a processor;

a memory comprising instructions stored thereon, the instructions comprising:

instructions that configure the processor to obtain sensor information related to at least two users from one or more sensors, the sensor information comprising one or more of image information or proximity information of each of the at least two users;

instructions that configure the processor to identify current gestures performed by each of the at least two users in accordance with the sensor information, wherein the one or more sensors enable the current gestures to be performed by the at least two users in at least two different temporal orders;

instructions that configure the processor to detect, when the at least two users are identified, an order at which the current gestures were performed by the at least two identified users based on the sensor information;

instructions that configure the processor to compare the current gestures of each of the at least two identified users and the temporal order of the current gestures between the at least two identified users with pre-stored gesture information specific to each identified user and related to predetermined gestures and an order of the predetermined gestures, when the at least two users are identified; and instructions that configure the processor to authorize access to the resource when the processor determines that the current gestures are in accordance with the predetermined gestures, and the temporal order of the current gestures are in accordance with the order of the predetermined gestures.

8. The system of claim 7, wherein the processor is configured to authenticate the at least two users based upon one or more of a password, a passcode, voice recognition, facial recognition, or biometric identification.

9. The system of claim 8, wherein the processor is configured to authorize access to the resource only when the at least two users are authenticated.

10. The system of claim 7, wherein the order of the predefined gestures comprises a simultaneous order or a sequential order with respect to time.

11. The method of claim 10, wherein the sensor information further comprises one or more of time information and location information, the time information being indicative of a time when a corresponding gesture of the current gestures is performed and the location information being indicative of location where a corresponding gesture of the current gestures is performed.

12. The system of claim 11, wherein the processor authorizes access to the resource only when the location information of at least one of the current gestures is determined to be in accordance with a location defined by a corresponding one of the predetermined gestures.

13. A computer readable non-transitory memory medium comprising a computer program stored thereon, the computer program configured to authorize access to a resource when the computer program is executed by a processor, the computer program comprising:

a program portion configured to:

configure the processor to obtain sensor information related to at least two users from one or more sensors, the sensor information comprising one or more of image information or proximity information of each of the at least two users;

configure the processor to identify current gestures performed by each of the at least two users in accordance with the sensor information, wherein the one or more sensors enable the current gestures to be performed by the at least two users in at least two different temporal orders;

configure the processor to detect an order at which the current gestures were performed by the at least two identified users based on the sensor information;

configure the processor to compare the current gestures of each of the at least two identified users and the temporal order of the current gestures between the at least two identified users with pre-stored gesture information specific to each identified user and related to predetermined gestures and an order of the predetermined gestures, when the at least two users are identified; and configure the processor to authorize access to the resource when the processor determines that the current gestures are in accordance with the predetermined gestures, and the temporal order of the current gestures are in accordance with the order of the predetermined gestures.

14. The computer program of claim 13, wherein the program portion is further configured to authenticate the at least two users based upon one or more of a password, a passcode, voice recognition, facial recognition, or biometric identification.

15. The computer program of claim 14, wherein the program portion is further configured to authorize access to the resource only when the at least two users are authenticated.

16. The computer program of claim 13, wherein the order of the predefined gestures comprises a simultaneous order or a sequential order with respect to time.

17. The computer program of claim 16, wherein the program portion is further configured to form the sensor information to comprise one or more of time information and location information, the time information indicative of a time when a corresponding gesture of the current gestures is performed and the location information indicative of location where a corresponding gesture of the current gestures is performed.

18. The computer program of claim 17, wherein the program portion is further configured to authorize access to the resource only when the location information of at least one of the current gestures is determined to be in accordance with a location defined by a corresponding one of the predetermined gestures.

19. The computer program of claim 13, wherein the program portion is further configured authorize access to the resources only when processor determines that the at least two users are distinct from each other.

\* \* \* \* \*